United States Patent
Pelfrey

(10) Patent No.: US 7,544,039 B1
(45) Date of Patent: Jun. 9, 2009

(54) DUAL SPOOL SHAFT WITH INTERSHAFT SEAL

(75) Inventor: Philip C. Pelfrey, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 424 days.

(21) Appl. No.: 11/453,431

(22) Filed: Jun. 14, 2006

(51) Int. Cl.
*F01D 11/04* (2006.01)

(52) U.S. Cl. .................. 415/69; 415/168.4; 415/230

(58) Field of Classification Search .............. 415/168.1, 415/168.2, 168.4, 69
See application file for complete search history.

(56) References Cited

U.S. PATENT DOCUMENTS

| | | | |
|---|---|---|---|
| 3,235,269 A | 2/1966 | Olesen | |
| 3,302,951 A | 2/1967 | Olesen | |
| 4,156,342 A | 5/1979 | Korta et al. | |
| 4,189,156 A | 2/1980 | Geary, Jr. et al. | |
| 4,193,603 A | 3/1980 | Sood | |
| 4,477,223 A | 10/1984 | Giroux | |
| 5,412,977 A | 5/1995 | Schmohl et al. | |
| 6,000,701 A | 12/1999 | Burgess | |
| 6,330,790 B1 | 12/2001 | Arora et al. | |
| 6,398,484 B1 | 6/2002 | Orikasa et al. | |
| 6,708,981 B2 | 3/2004 | Hall et al. | |
| 6,976,679 B2 * | 12/2005 | Goss et al. | 415/168.2 |

* cited by examiner

*Primary Examiner*—Richard Edgar
(74) *Attorney, Agent, or Firm*—John Ryznic

(57) ABSTRACT

A twin spool rotor shaft having an inner rotor shaft and an outer rotor shaft concentric to the inner rotor shaft, an outer shaft seal assembly formed between the outer rotor shaft and a stationary casing, and an inner shaft seal assembly formed between the outer shaft and the inner shaft. The two seal assemblies include a purge cavity and two drain cavities formed on the sides of the purge cavity. A purge fluid is supplied to the outer purge cavity, and drain passages in the stationary housing drain the two outer drain cavities without mixing the two fluids. The outer purge cavity is fluidly connected to the inner purge cavity through a radial passage in the outer rotor shaft in one embodiment, or through a bore tube passing within the inner rotor shaft in a second embodiment. The inner drain cavities are connected to the outer drain cavities through similar connections, either through radial passages in the outer rotor shaft in the first embodiment or through additional bore tubes in the inner rotor shaft in the second embodiment.

19 Claims, 3 Drawing Sheets

DUAL SPOOL SHAFT WITH INTERSHAFT SEAL

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to a seal assembly in a concentric shaft assembly, and more specifically to a seal assembly in a concentric shaft assembly that prevents mixing of two fluids that leak past the seals.

2. Description of the Related Art including information disclosed under 37 CFR 1.97 and 1.98

In a turbo-pump, such as one used in a rocket engine, a fuel and an oxidizer are mixed in the combustion chamber to propel the rocket. Since the turbopump is subjected to both the fuel and the oxidizer, the turbopump requires an inter-propellant seal (IPS) to maintain separation between the fuel and the oxidizer to prevent premature combustion. Such a seal arrangement is disclosed in U.S. Pat. No. 6,976,679 B2 issued on Dec. 20, 2005 to Goss et al and entitled INTER-FLUID SEAL ASSEMBLY AND METHOD THEREFOR. In the Prior Art, a series of knife-edge, labyrinth, and contacting seals are spaced along with purge and drain cavities to capture any leakage of the fuel and the oxidizer, collect the leakages in separate cavities, and discharge the leakages from the turbopump without any mixing of the leakages.

In a turbopump that has dual spools that form concentric shafts, there would be a need to also seal the cavity between the two concentric shafts and prevent any leakages from mixing as described above. There is a need in the prior art to provide for a seal assembly between concentric shafts to prevent mixture of leakages of materials that would react, and to discharge the leakages from the apparatus without mixing the two fluids.

BRIEF SUMMARY OF THE INVENTION

The present invention is a dual spool turbopump used for pump a fuel and an oxidizer in a rocket engine, in which both the outer spool and the inner spool have a seal arrangement that collects the leakages of the fuel and the oxidizer in separate chambers to prevent mixing and to carry away the leakages from the turbopump. A non-reactive fluid such as helium gas is supplied under a relatively high pressure to a middle chamber of the seal assembly. A fuel leakage chamber is located on one side of the middle or helium chamber to collect fuel leakage past a fuel seal. An oxidizer leakage chamber is located on the other side of the middle or helium chamber to collect oxidizer leakage past an oxidizer seal. The helium passes into both the fuel leakage chamber and the oxidizer leakage chamber to combine with and to carry away from the turbopump the two reactive fluids separately. The feature of the invention is the leakage fluid passages in the inner spool that provides for supply and exhaust passages of the leakages from the seal assembly. In one embodiment, the passages in the inner spool are radial passages. In a second embodiment, the passages are axial bore tubes.

DETAILED DESCRIPTION OF THE INVENTION

The present invention is a turbopump used to deliver a fuel and an oxidizer to a combustion chamber in a rocket engine. However, the subject matter of the present invention is to a dual spool rotor shaft arrangement with seals on both shafts that function to prevent two fluids from mixing. The present invention could be practiced on a dual spool shaft system in which mixing of leakage of two fluids past the seals are not desired.

Figure 1:
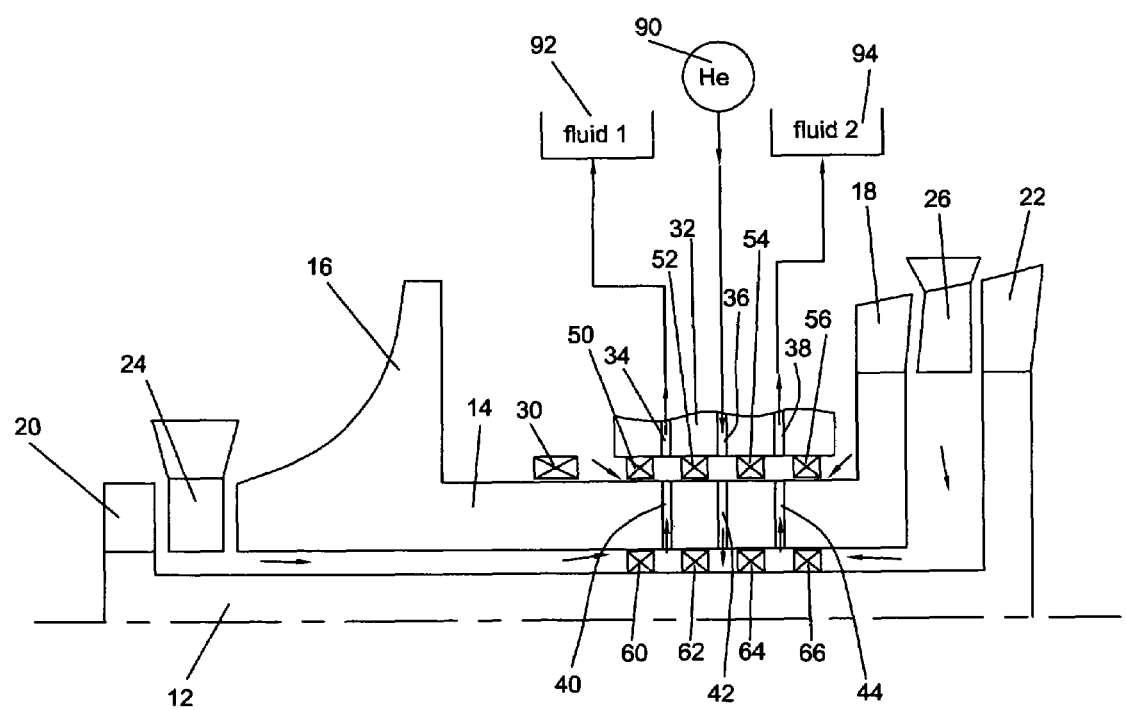
FIG. 1 shows a cross section view of a turbopump having two spools and a seal assembly having the inner spool fluid passages arranged radially in solid inner spool.

FIG. 1 shows a first embodiment of the seal arrangement in the turbopump of the present invention. An inner spool 12 includes an inducer or compressor blade 20 and a turbine blade 22. An outer spool 14 includes an impeller 16 and a turbine blade 18. Spaced between the inducer 20 and the impeller 16 is a guide vane 24. Spaced between the turbine blades 18 and 22 is a nozzle or guide vane 26. A number of seals are used to seal the spool shaft from the fluids that are moved through the turbopump. One seal 30 is shown in FIG. 1 to seal the impeller flow against the outer spool 14. Other seals are used but are not shown in the Figures in order to clarify the inventive concept. The turbopump stationary casing or housing 32 extends toward the outer spool 14 to form a support section for an outer shaft seal assembly that prevents mixture of the fluids flowing in the turbopump that leak past the seals. The outer shaft seal assembly includes four seals (50, 52, 54, 56) along the outer rotor shaft. The seals can be one or more of a knife-edge, labyrinth, and contacting seals. The first outer shaft seal 50 provides a seal against the fluid flowing out of the impeller 14. In the case of a turbopump for a rocket engine, the impeller would be pumping high pressure liquid oxygen or LOX fluid. A second outer shaft seal 52 is located adjacent to the first outer shaft seal 50 to form an oxidizer drain cavity or upstream drain cavity. A third outer shaft seal 54 is located adjacent to the second outer shaft seal 52 and forms a purge cavity. A fourth outer shaft seal 56 is adjacent to the third outer shaft seal 54 and functions to seal the outer spool from the fluid passing into the turbine. In the case of the turbopump for a rocket engine, this fluid would be the fuel used to mix with the oxidizer. A fuel or downstream drain cavity is formed between the third outer shaft seal 54 and the fourth outer shaft seal 56.

In order to prevent the oxidizer leakage and the fuel leakage from mixing, the middle or drain chamber is supplied with a fluid that is non-reactive with both of the oxidizer and the fuel. In the case of the turbopump, the non-reactive fluid is helium. Helium gas is supplied under pressure from an inert gas source 90 through a supply or purge passage 36 in the housing 32 to the middle or purge chamber formed between the second outer shaft seal 52 and the third outer shaft seal 54.

Because it is under pressure—relative to the oxidizer and the fuel—the helium will leak into both the oxidizer leakage drain chamber and the fuel leakage drain chamber and mix with these leaked fluids. This prevents the two leaked fluids from mixing and resulting in a pre-combustion within the turbopump. Both the oxidizer leakage drain chamber and the fuel leakage drain chamber are in fluid communication with outer shaft drain passages 34 and 38 in the housing 32 to discharge the oxidizer and helium mixture and the fuel and helium mixture to separate locations outside of the turbopump without mixing the two reactive fluids. A first fluid tank 92 collects the mixture of helium and the first fluid, and a second fluid tank 94 collects the mixture of helium and the second fluid.

A similar seal arrangement is located between the outer spool 14 and the inner spool 12 to collect the leakages from the inducer 20 and the second stage turbine blade 22. The fluid pumped by the inducer 20, such as the LOX in the case of the turbopump, can leak toward a first inner shaft seal 60 located between the spools, and the fuel can leak toward a fourth inner shaft seal 66 also located between the two spools 14 and 12. A second inner shaft seal 62 and a third inner shaft seal 64 is placed in series with the other two inner shaft seals 60 and 66 located between the two pools 12 and 14 to form the same sealing arrangement as described above with respect to the outer rotor shaft 14. An oxidizer leakage drain chamber is formed between the first inner shaft seal 60 and the second inner shaft seal 62, a helium purge chamber is formed between the second inner shaft seal 62 and the third inner shaft seal 64, and a fuel leakage drain chamber is formed between the third inner shaft seal 64 and the fourth inner shaft seal 66 as in the outer shaft seals, the inner shaft seals 60, 62, 64, 66 can be one or more of a knife-edge, labyrinth, and contacting seals. In the first embodiment of FIG. 1, the helium purge chamber on the outer spool 14 is in fluid communication with the helium purge chamber on the inner spool 12 by a radial passage 42 in the outer spool 14. The oxidizer leakage drain chamber of the outer spool 14 is also in fluid communication with the oxidizer leakage drain chamber of the inner spool 12 by a radial passage 40 in the outer spool 14. The fuel leakage drain chamber of the outer spool 14 is also in fluid communication with the fuel leakage drain chamber of the inner spool 12 by a radial passage 44 in the outer spool 14. Helium or a purge fluid supplied through the purge passage 42 leaks into the two adjacent drain chambers to collect the fluids and carry them away from the inner spool 12 through the drain passages 40 and 44 respectively. The higher pressure helium or purge fluid prevents the two reactive fluids (oxidizer and fuel) from mixing within the inner spool 12 and pre-combusting.

Figure 3:
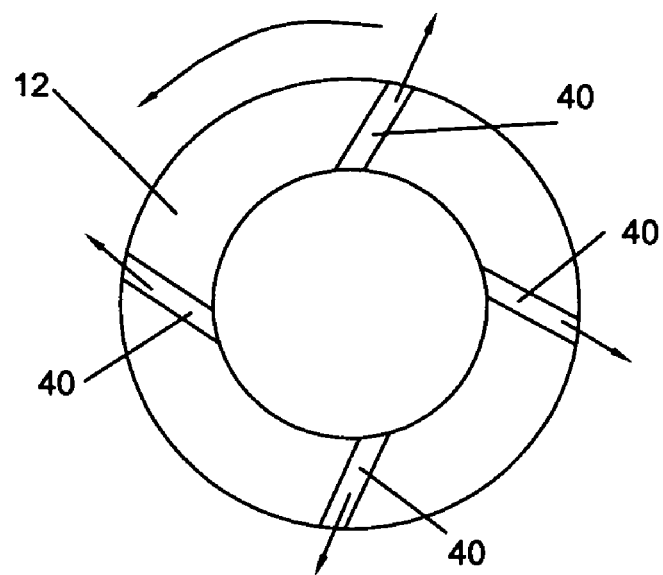
FIG. 3 shows a cross section view of a section of the inner spool in which the radial fluid passages are slanted to promote the flow of fluid in the passages.
Figure 4:
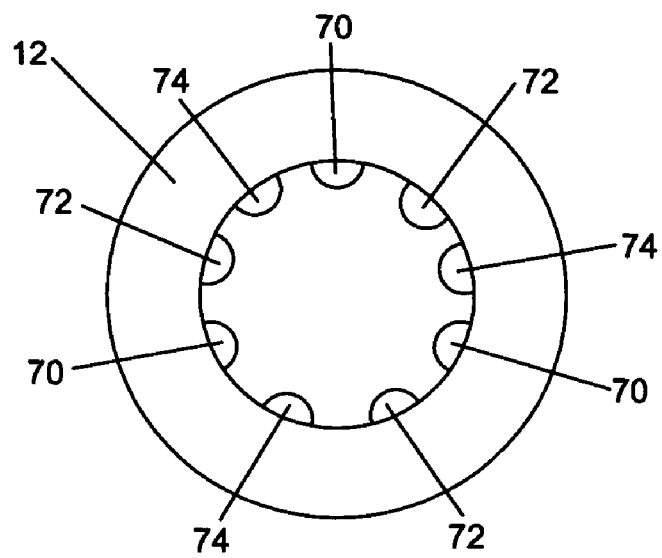
FIG. 4 shows a cross section view of a section of the inner spool in which scallops are used to carry the fluid into bore tubes within a hollow inner shaft.

FIG. 3 shows a cross section view of the radial drain passage 40 in the outer spool 12 used to carry the helium (or purge fluid) and oxidizer mixture from the oxidizer leakage drain chamber. More than one radial passage 40 can be used depending upon the diameter of the passage 40 and the amount of fluid to discharge. FIG. 3 shows four of the radial passages 40. FIG. 3 also shows the radial passage 40 to be slanted away from a rotational direction (the arrow) of the spool 12. The slant of the passages 40 in this direction will act to propel the fluid outward from the spool 12 due to rotation of the spool 12. Radial drain passages 38 are also slanted in this direction. The radial purge passages 36 that deliver the helium (or purge fluid) must flow in an opposite direction (toward the spool 12) and therefore the radial purge passages 36 slant in the direction of rotation of the spool 12. To improve the fluid flow through the passages (34, 36, and 38), impeller blades can be placed within the passage to propel the fluid as well.

Figure 2:
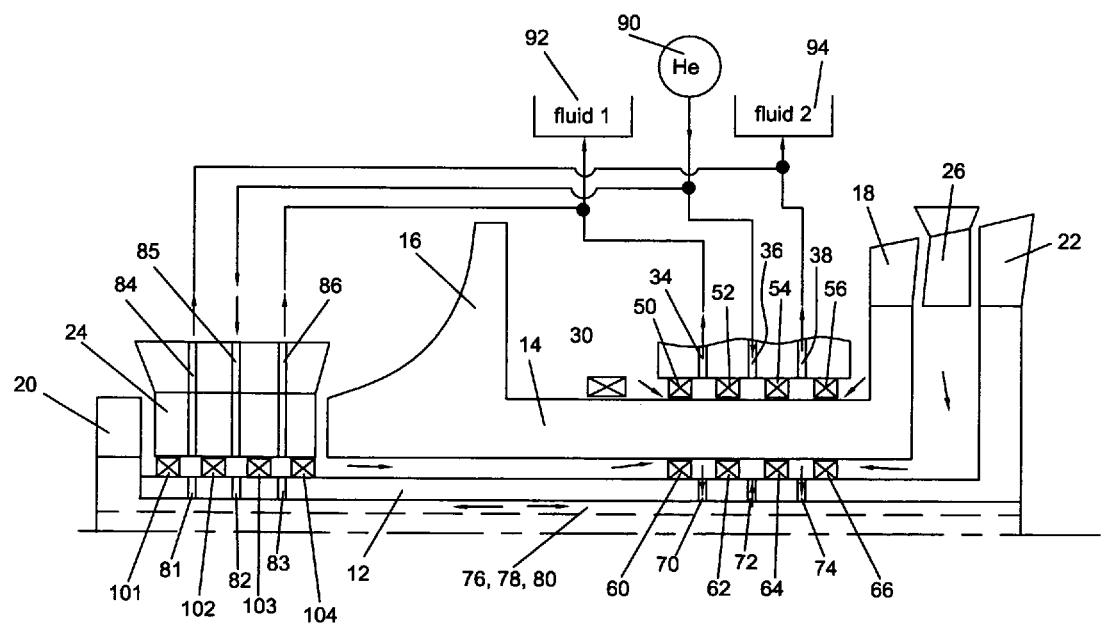
FIG. 2 shows a cross section view of a turbopump having two spools and a seal assembly having the inner spool fluid passages arranged axially within bore tubes inside a hollow inner spool.

In the second embodiment of the present invention as shown in FIG. 2, the radial drain and purge passages (40,42, 44) in the outer spool 14 are eliminated. The inner spool—a solid spool in the FIG. 1 embodiment—is a hollow spool in the FIG. 2 embodiment in order to carry a plurality of bore tubes that are arranged within the hollow portion of the inner spool 12 and in the axial direction of the inner spool 12. As least three bore tubes (76,78,80) are located within the inner spool 12 to carry the three fluids in which the passages (40, 42,44) performed in the FIG. 1 embodiment. The first bore tube 76 includes a first annulus at an end of the tube to communicate with a radial drain passage 70 in the inner spool 12 on the aft end of the bore tube 76. The second bore tube 78 includes a second annulus at an end of the tube to communicate with radial purge passage 72. The third bore tube 80 includes a third annulus at an end of the tube to communicate with radial drain passage 74. The three bore tubes are concentric with the third bore tube 80 being within the second bore tube 78, and the second bore tube 78 is within the first bore tube 76. Each of the three bore tubes (76, 78, 80) includes an annulus on the forward end of the tube adjacent to the guide vane 24. The guide vane 24 includes four seals 101, 102, 103, and 104 similar to the seals on the outer shaft 14 and the inner shaft 12. The guide vane 24 includes internal passages for the drain passages and the purge passage. A first fluid drain passage 84 in the guide vane 24 is in fluid communication with the first bore tube 76 to drain the first fluid from the radial drain passage 70. A fluid purge passage 85 in the guide vane 24 is in fluid communication with the second bore tube 78 to deliver the purge fluid to the radial purge passage 72. A second fluid drain passage 85 in the guide vane 24 is in fluid communication with the third bore tube 80 to drain the second fluid from the radial drain passage 74. Fluids lines connects the drain passages 84 and 86 and the purge passage 85 to the drain reservoirs 92 and 94 and the purge fluid supply 90.

The purge fluid is supplies from a purge tank 90, through fluid line to the purge passage 85 in the guide vane 24, through the radial passage 82 and into the second bore tube 78, through the inner radial purge passage 72 in the inner spool and then into the purge chamber formed between the second inner shaft seal 62 and the third inner shaft seal 64. A mixture of the purge fluid and the first fluid that collects in the cavity is discharged through the radial drain passage 70 in the inner shaft 12, passes through the first or outer bore tube 76 and into the radial purge passage 86 in the guide vane 24, and into the first fluid drain tank 92. A mixture of the purge fluid and the second fluid that collects in the cavity is discharged through the radial drain passage 74 in the inner shaft 12, passes through the third or inner bore tube 80 and into the radial purge passage 84 in the guide vane 24, and into the second fluid drain tank 94. Each of the annuluses includes circular annular grooves on the bore tubes that open out toward the inner spool 12 and the passages in the guide vane 24. Each of the radial drain and purge passages (70, 72, and 74) can include a plurality of passages to carry more fluid as discussed with respect to FIG. 3 in the first embodiment.

The present invention is described for use in a turbopump used in a rocket engine. However, the present invention can be used to provide a seal between two concentric shafts that rotate with respect to one another, and that have two fluids acting on the shafts on opposite sides of the seal in which mixing of the two fluids is not desired. The present invention can also be used in a device having two concentric shafts that do not rotate, but need to separate two fluids from mixing and to collect the leakage of the two fluids past the seals from mixing.

I claim the following:

1. A concentric shaft and seal assembly, the assembly comprising:

An inner shaft;

An outer shaft concentric to the inner shaft;

An outer shaft seal assembly forming a seal between the outer shaft and the assembly casing, the outer shaft seal assembly comprising a first outer shaft seal, a second outer shaft seal, a third outer shaft seal, and a fourth outer shaft seal;

The first outer shaft seal and the second outer shaft seal forming a first outer shaft drain cavity, the second outer shaft seal and the third outer shaft seal forming an outer shaft purge cavity, and third outer shaft seal and the fourth outer shaft seal forming a second outer shaft drain cavity;

An inner shaft seal assembly forming a seal between the outer shaft and the inner shaft and comprising a first inner shaft seal, a second inner shaft seal, a third inner shaft seal, and a fourth inner shaft seal;

The first inner shaft seal and the second inner shaft seal forming a first inner shaft drain cavity, the second inner shaft seal and the third inner shaft seal forming an inner shaft purge cavity, and the third inner shaft seal and the fourth inner shaft seal forming a second inner shaft drain cavity;

The assembly casing comprising a purge fluid passage in fluid communication with the outer shaft purge cavity, a first fluid drain passage in fluid communication with the first outer shaft drain cavity, and a second fluid drain passage in fluid communication with the second outer shaft drain cavity; and, Fluid communication means to fluidly communicate the first outer shaft drain cavity with the first inner shaft drain cavity, the outer shaft purge cavity with the inner shaft purge cavity, and the second outer shaft drain cavity with the second inner shaft drain cavity.

2. The concentric shaft and seal assembly of claim 1, and further comprising:

The fluid communicating means are fluid passages formed in the outer shaft.

3. The concentric shaft and seal assembly of claim 2, and further comprising:

The fluid passages are radial passages and are slanted in a direction such that rotation of the outer rotor shaft promotes the flow of fluid through the respective fluid passage.

4. The concentric shaft and seal assembly of claim 1, and further comprising:

The fluid communicating means are fluid passages formed in the inner shaft.

5. The concentric shaft and seal assembly of claim 4, and further comprising:

The fluid passages include at least three bore tubes formed on the inner rotor shaft and at least three radial passages in the inner rotor shaft that fluidly communicate the inner rotor shaft chambers with the respective bore tubes.

6. A twin spool rotor shaft assembly for a turbine, the assembly comprising:

An inner rotor shaft;

An outer rotor shaft concentric to the inner rotor shaft;

An outer shaft seal assembly forming a seal between the outer rotor shaft and the assembly casing and comprising a first outer shaft seal, a second outer shaft seal, a third outer shaft seal, and a fourth outer shaft seal;

The first outer shaft seal and the second outer shaft seal forming a first outer shaft drain cavity, the second outer shaft seal and the third outer shaft seal forming an outer shaft purge cavity, and third outer shaft seal and the fourth outer shaft seal forming a second outer shaft drain cavity;

An inner shaft seal assembly forming a seal between the outer rotor shaft and the inner rotor shaft and comprising a first inner shaft seal, a second inner shaft seal, a third inner shaft seal, and a fourth inner shaft seal;

The first inner shaft seal and the second inner shaft seal forming a first inner shaft drain cavity, the second inner shaft seal and the third inner shaft seal forming an inner shaft purge cavity, and third inner shaft seal and the fourth inner shaft seal forming a second inner shaft drain cavity;

The assembly casing comprising a purge fluid passage in fluid communication with the outer shaft purge cavity, a first fluid drain passage in fluid communication with the first outer shaft drain cavity, and a second fluid drain passage in fluid communication with the second outer shaft drain cavity; and, Fluid communication means to fluidly communicate the first outer shaft drain cavity with the first inner shaft drain cavity, the outer shaft purge cavity with the inner shaft purge cavity, and the second outer shaft drain cavity with the second inner shaft drain cavity.

7. The twin spool rotor shaft assembly of claim 6, and further comprising:

The fluid communicating means are fluid passages formed in the outer rotor shaft.

8. The twin spool rotor shaft assembly of claim 7, and further comprising:

The fluid passages are radial passages and are slanted in a direction such that rotation of the outer rotor shaft promotes the flow of fluid through the respective fluid passage.

9. The twin spool rotor shaft assembly of claim 6, and further comprising:

The fluid communicating means are fluid passages formed in the inner rotor shaft.

10. The twin spool rotor shaft assembly of claim 9, and further comprising:

The fluid passages include at least three bore tubes formed on the inner rotor shaft and at least three radial passages in the inner rotor shaft that fluidly communicate the inner rotor shaft chambers with the respective bore tubes.

11. A process for preventing two fluids from leaking across a seal assembly and mixing together in a concentric shaft assembly, the first fluid being associated with one end of the concentric shaft assembly and the second fluid being associated with the other end of the concentric shaft assembly, the process comprising the steps of:

Forming an outer seal assembly between the outer shaft and a casing that includes a first fluid outer drain cavity and a second fluid outer drain cavity;

Forming an inner seal assembly between the outer shaft and the inner shaft that includes a first fluid inner drain cavity and a second fluid inner drain cavity;

Supplying a purging fluid to the outer seal assembly at a higher pressure than the first fluid pressure and the second fluid pressure such that the purging fluid leaks into the first fluid outer drain cavity and the second fluid outer drain cavity;

Draining the first fluid outer drain cavity;

Draining the second fluid outer drain cavity; and,

Fluidly connecting the inner seal assembly with the outer seal assembly such that the purging fluid leaks into the first fluid inner drain cavity and the second fluid inner drain cavity, the inner first fluid drain cavity is fluidly connected with the first fluid outer drain cavity, and the inner second fluid drain cavity is fluidly connected with the second fluid outer drain cavity such that the purging fluid is supplied to both purge cavities and the leakage is collected from the drain cavities without mixing the first fluid with the second fluid.

12. The process of claim 11, and further comprising the step of:

The step of fluidly connecting the outer purge cavity to the inner purge cavity and the outer drain cavities with the inner drain cavities comprises forming radial passages in the outer rotor shaft.

13. The process of claim 12, and further comprising the step of:

Forming the radial passages in the outer rotor shaft with a slant such that rotation of the outer rotor shaft promotes the flow of the fluid within the passage.

14. The process of claim 11, and further comprising the step of:

The step of fluidly connecting the outer purge cavity to the inner purge cavity and the outer drain cavities with the inner drain cavities comprises providing at least three bore tubes within the inner rotor shaft and forming at least three radial passages in the inner rotor shaft.

15. A twin spool turbopump comprising:

An outer rotor shaft having an impeller on an upstream end and a first turbine blade on a downstream end;

An outer shaft seal assembly formed between the outer rotor shaft and the stationary casing, the outer shaft seal assembly including an upstream drain cavity, a purge cavity, and a downstream drain cavity;

An inner rotor shaft having a compressor blade on an upstream end and a second turbine blade on a downstream end;

An inner shaft seal assembly formed between the outer rotor shaft and the inner rotor shaft, the inner shaft seal assembly including an upstream drain cavity, a purge cavity, and a downstream drain cavity;

The stationary casing including a purge fluid passage in communication with the outer shaft purge cavity, an upstream drain passage in communication with the outer shaft upstream drain cavity, and a downstream drain passage in communication with the outer shaft downstream drain cavity; and, Fluid passage means to fluidly communicate the outer shaft purge cavity with the inner shaft purge cavity, the outer shaft upstream drain cavity with the inner shaft upstream drain cavity, and the outer shaft downstream drain cavity with the inner shaft downstream drain cavity such that the upstream drain cavities do not mix with the downstream drain cavities.

16. The twin spool turbopump of claim 15, and further comprising:

The fluid passage means comprises radial passages in the outer rotor shaft to fluidly communicate the purge cavities, the upstream drain cavities, and the downstream drain cavities without mixing the two fluids.

17. The twin spool turbopump of claim 16, and further comprising:

The radial passages are slanted such that rotation of the outer rotor shaft promotes the flow of fluid through the radial passages.

18. The twin spool turbopump of claim 15, and further comprising:

The fluid passage means comprises at least three bore tubes located within the inner rotor shaft; and, At least three radial passages in the inner rotor shaft communicating the outer purge cavity with the inner purge cavity, the outer upstream drain cavity with the inner upstream drain cavity, and the outer downstream drain cavity with the inner downstream drain cavity.

19. The twin spool turbopump of claim 18, and further comprising:

A guide vane located between the impeller and the compressor blade, the guide vane comprising a purge fluid passage, an upstream drain passage, and a downstream drain passage, whereby the purge cavities and the drain cavities are in communication with each other through the guide vane.

* * * * *